United States Patent
Hita et al.

(10) Patent No.: US 10,150,465 B2
(45) Date of Patent: Dec. 11, 2018

(54) HYBRID CONSTRUCTION MACHINE

(71) Applicant: Hitachi Construction Machinery Co., Ltd., Taito-ku, Tokyo (JP)

(72) Inventors: Masafumi Hita, Tsuchiura (JP); Seiji Ishida, Hitachinaka (JP); Ken Takeuchi, Kasumigaura (JP); Shinya Imura, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/508,552

(22) PCT Filed: Dec. 8, 2015

(86) PCT No.: PCT/JP2015/084374
§ 371 (c)(1),
(2) Date: Mar. 3, 2017

(87) PCT Pub. No.: WO2016/117232
PCT Pub. Date: Jul. 28, 2016

(65) Prior Publication Data
US 2017/0274891 A1 Sep. 28, 2017

(30) Foreign Application Priority Data
Jan. 22, 2015 (JP) .................................. 2015-010340

(51) Int. Cl.
*B60W 20/13* (2016.01)
*E02F 9/12* (2006.01)
(Continued)

(52) U.S. Cl.
CPC ............. *B60W 20/13* (2016.01); *E02F 9/123* (2013.01); *E02F 9/2075* (2013.01);
(Continued)

(58) Field of Classification Search
CPC ......... B60W 20/13; E02F 3/32; E02F 9/2271; E02F 9/2296
See application file for complete search history.

(56) References Cited

U.S. PATENT DOCUMENTS

| | | | |
|---|---|---|---|
| 2009/0222158 A1 | 9/2009 | Kubota et al. | |
| 2014/0000252 A1 | 1/2014 | Sora | |
| 2014/0147238 A1 | 5/2014 | Izumi et al. | |

FOREIGN PATENT DOCUMENTS

| | | |
|---|---|---|
| JP | 4867665 B2 | 2/2012 |
| JP | 2012-82644 A | 4/2012 |

(Continued)

OTHER PUBLICATIONS

International Search Report (PCT/ISA/210) issued in PCT Application No. PCT/JP2015/084374 dated Mar. 1, 2016 with English translation (3 pages).

(Continued)

*Primary Examiner* — Michael D Lang
(74) *Attorney, Agent, or Firm* — Crowell & Moring LLP (57) ABSTRACT

A motor generator (27) is connected mechanically to an engine (21) and a hydraulic pump (23). The hydraulic pump (23) delivers pressurized oil to cylinders (11D) to (11F) in a working mechanism (11), a traveling hydraulic motor (25) and a revolving hydraulic motor (26). The revolving hydraulic motor (26) drives a revolving device (3) in cooperation with a revolving electric motor (33). The motor generator (27) and the revolving electric motor (33) are connected electrically to an electricity storage device (31). An HCU (36) sets a target electricity storage rate (SOC0) of the electricity storage device (31) and a pump output limit (POL0) of the hydraulic pump (23) corresponding to a mode selected by a mode selection device (38). The HCU (36) controls the engine (21), the motor generator (27), the revolving electric motor (33) and the electricity storage (Continued)

device (31) corresponding to the target electricity storage rate (SOC0) and the pump output limit (POL0).

7 Claims, 8 Drawing Sheets (51) Int. Cl.
*E02F 9/20* (2006.01)
*E02F 3/32* (2006.01)
*E02F 9/22* (2006.01)

(52) U.S. Cl.
CPC .......... *E02F 9/2091* (2013.01); *E02F 9/2095* (2013.01); *E02F 3/32* (2013.01); *E02F 9/2246* (2013.01); *E02F 9/2271* (2013.01); *E02F 9/2296* (2013.01)

(56) References Cited

FOREIGN PATENT DOCUMENTS

JP       2012-172520 A     9/2012
JP       2014-148879 A     8/2014

OTHER PUBLICATIONS

Japanese-language Written Opinion (PCT/ISA/237) issued in PCT Application No. PCT/JP2015/084374 dated Mar. 1, 2016 (3 pages).
Extended European Search Report issued in counterpart European Application No. 15878921.4 dated Aug. 20, 2018 (eight (8) pages).

| MODE | TARGET ELECTRICITY STORAGE RATE CHANGING VALUE SOCn [%] | PUMP OUTPUT LIMIT CHANGING VALUE POLn [kW] |
|---|---|---|
| E | 40 | 80 |
| P1 | 60 | 100 |
| P2 | 70 | 100 |

HYBRID CONSTRUCTION MACHINE

TECHNICAL FIELD

The present invention relates to a hybrid construction machine on which an engine and a motor generator are mounted.

BACKGROUND ART

In general, there is known a hybrid construction machine provided with a motor generator that is jointed mechanically to an engine and a hydraulic pump, and an electricity storage device such as an lithium ion battery or capacitor and the like (for example, refer to Patent Document 1). In this hybrid construction machine, the motor generator has a function of charging power generated by a driving force of the engine in the electricity storage device or assisting in the engine by power running which uses power of the electricity storage device. Many hybrid construction machines are provided with an electric motor separated from the motor generator, and the electric motor acts for or assists in an operation of a hydraulic actuator. For example, at the time of performing a revolving operation by the electric motor, the electric motor performs or assists the revolving operation of an upper revolving structure by power supply to the electric motor, and braking energy at a revolving stop is regenerated to perform a charge of the electricity storage device.

Here, Patent Document 1 discloses the configuration of highly efficiently collecting regeneration energy by appropriately controlling an electricity storage amount in the electricity storage device. In this case, the next operation of a working mechanism or the upper revolving structure is estimated based upon operating information of an operator and a target electricity storage amount is set based upon an estimation value of the regeneration power calculated from the estimated operation.

PRIOR ART DOCUMENT

Patent Document

Patent Document 1: Japanese Patent Laid-Open No. 2012-82644 A

SUMMARY OF THE INVENTION

In general, in a case where an electricity storage device repeats the charge/discharge in an electricity storage rate higher than a low electricity storage rate, a lifetime of the electricity storage device is the earlier degraded. On the other hand, according to Patent Document 1, the target electricity storage rate is set based upon a relationship between the regeneration energy and the electricity storage amount of the electricity storage device. However, in the method according to Patent Document 1, since the degradation of the electricity storage device due to repetition of the charge/discharge is not considered, there is a possibility that the lifetime of the electricity storage device degrades.

On the other hand, when the target electricity storage amount is set to be low, it is possible to use the electricity storage device for a long period. However, when the target electricity storage amount of the electricity storage device is always set to a low value, for example, in a case where a heavy load work continues, energy to be supplied to the electric motor becomes insufficient, possibly causing a problem with an operation of the working mechanism or the like.

The present invention is made in view of the aforementioned problems in the conventional art, and an object of the present invention is to provide a hybrid construction machine that can suppress a degradation of an electricity storage device and perform a desired vehicle body movement.

(1) For solving the above problems, a hybrid construction machine according to the present invention comprising: an engine that is provided on a vehicle body; a hydraulic pump that is connected mechanically to the engine; a hydraulic actuator that is driven by pressurized oil from the hydraulic pump; a motor generator that is connected mechanically to the engine; an electricity storage device that is connected electrically to the motor generator; and a controller that controls charge/discharge power of the motor generator and the electricity storage device, characterized in that: a mode selection device that selects any one of a plurality of modes in which target electricity storage rates differing from each other are set is further provided, and the controller controls the charge/discharge power of the motor generator and the electricity storage device such that an electricity storage rate of the electricity storage device converges with a target electricity storage rate of the mode selected by the mode selection device.

Thereby, an operator can switch the mode in accordance with a load of the hydraulic actuator by the mode selection device. For example, since it is possible to lower the target electricity storage rate at a light load, the electricity storage device repeatedly performs the charge/discharge in a state of a low electricity storage rate to suppress the degradation of the electricity storage device, making it possible to extend the lifetime of the electricity storage device. On the other hand, at the time of performing a successive heavy load work as much as to surpass the charge of the electricity storage device, it is possible to increase the target electricity storage rate. Therefore, it is possible to perform the movement of the vehicle body in accordance with a demand of the operator for a long period.

(2) According to the present invention, the controller includes a maximum power setting part that increases or decreases maximum power of the hydraulic pump, wherein the maximum power setting part limits the maximum power of the hydraulic pump to a smaller value according to the lowering of the target electricity storage rate of the mode selected by the mode selection device.

Thereby, the charge can catch up by an amount by which a discharge energy amount of the electricity storage device becomes small at working. As a result, it is possible to perform the vehicle body movement by a low target electricity storage rate as a result of priority of the lifetime in the electricity storage device with no concern about a reduction in electricity storage rate.

(3) According to the present invention, the controller continuously and gradually changes a value of the target electricity storage rate from a value before mode change to a value after mode change when the mode is changed by the mode selection device. Thereby, since it is possible to gradually change the electricity storage rate at the mode change, it is possible to prevent an abrupt change in electricity storage rate to prevent an unexpected vehicle body movement.

(4) The present invention further comprising: a vehicle body operating state detecting device that detects an operating state of the vehicle body, wherein the maximum power setting part changes the maximum power of the hydraulic pump when the mode is changed by the mode selection device and a non-operating state of the vehicle body is detected by the vehicle body operating state detecting device. Thereby, since the maximum power of the hydraulic pump is not changed during operating the vehicle body, the maximum power of the hydraulic pump can be changed in a state where the vehicle body is stable.

(5) According to the present invention, the mode selection device does not limit the maximum power of the hydraulic pump and can select a maximum electricity storage rate mode in which the target electricity storage rate is set in the vicinity of the maximum electricity storage rate of the electricity storage device. Thereby, by selecting the maximum electricity storage rate mode, even when work continuity is top-prioritized, for example, as at the climbing travel and the like, the vehicle body movement can continue for a possible long time.

(6) The present invention further comprising: an in-vehicle monitor that displays the mode selected by the mode selection device. Thereby, an operator can easily recognize the mode selected at present by visual contact with the in-vehicle monitor.

(7) According to the present invention, maximum output of the engine is made smaller than the maximum power of the hydraulic pump. Thereby, at a light load, the hydraulic pump can be driven by a driving force of the engine, and at a heavy load, the hydraulic pump can be driven by an assist force of the motor generator in addition to the engine.

MODE FOR CARRYING OUT THE INVENTION

Hereinafter, a hybrid hydraulic excavator as a hybrid construction machine according to an embodiment in the present invention will be explained as an example with reference to the accompanying drawings.

Figure 1:
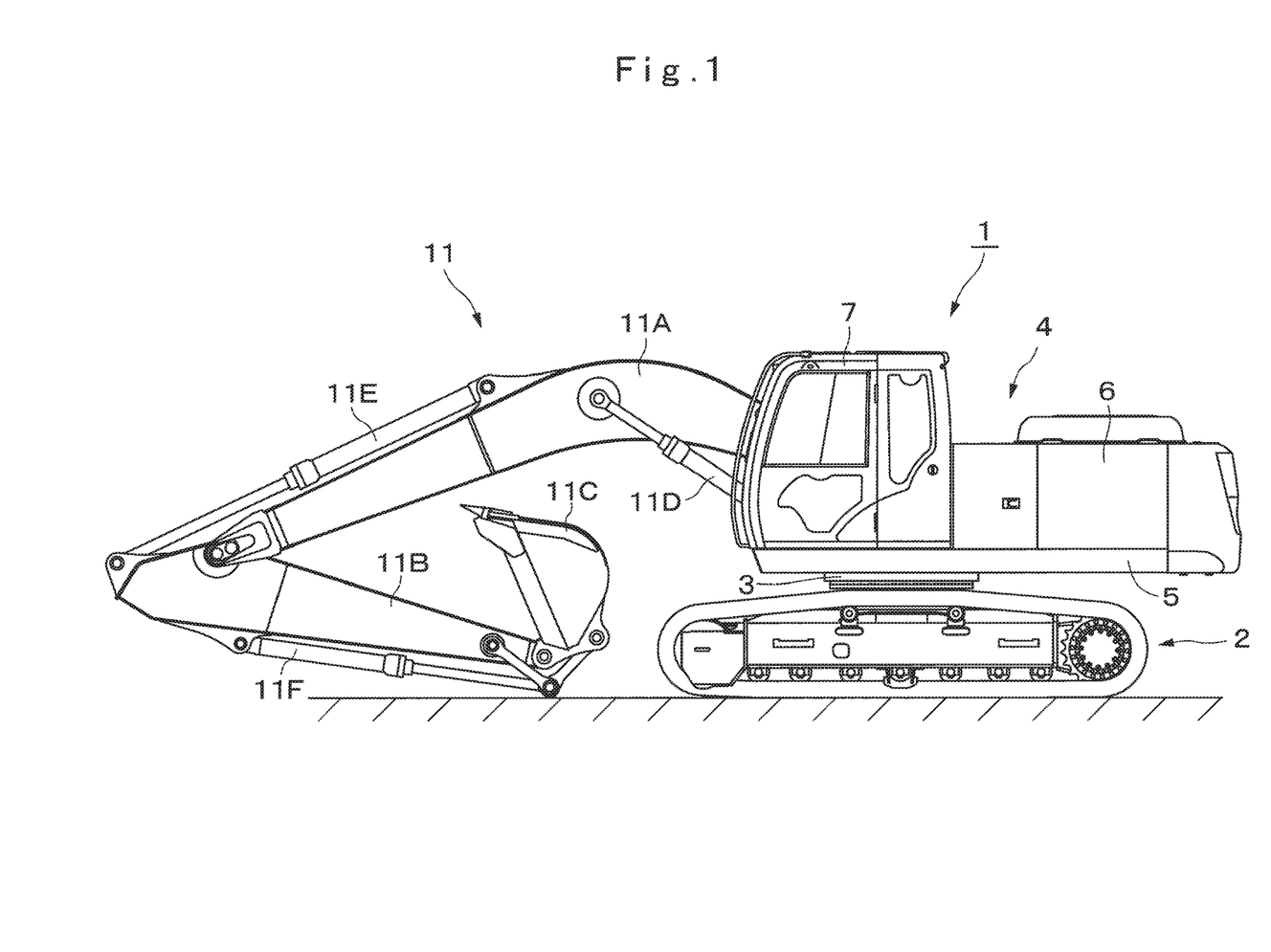
FIG. 1 is a front view showing a hybrid hydraulic excavator according to an embodiment of the present invention.

FIG. 1 to FIG. 9 show an embodiment of the present invention. In FIG. 1, a hybrid hydraulic excavator 1 (hereinafter, referred to as "hydraulic excavator 1") is provided with an engine 21 and a motor generator 27 to be described later. The hydraulic excavator 1 includes an automotive lower traveling structure 2 of a crawler type, a revolving device 3 that is provided on the lower traveling structure 2, an upper revolving structure 4 that is rotatably mounted on the lower traveling structure 2 through the revolving device 3, and a working mechanism 11 that is provided in the front side of the upper revolving structure 4 and performs an excavating operation of earth and sand and the like. At this time, the lower traveling structure 2 and the upper revolving structure 4 configure a vehicle body of the hydraulic excavator 1.

Figure 8:
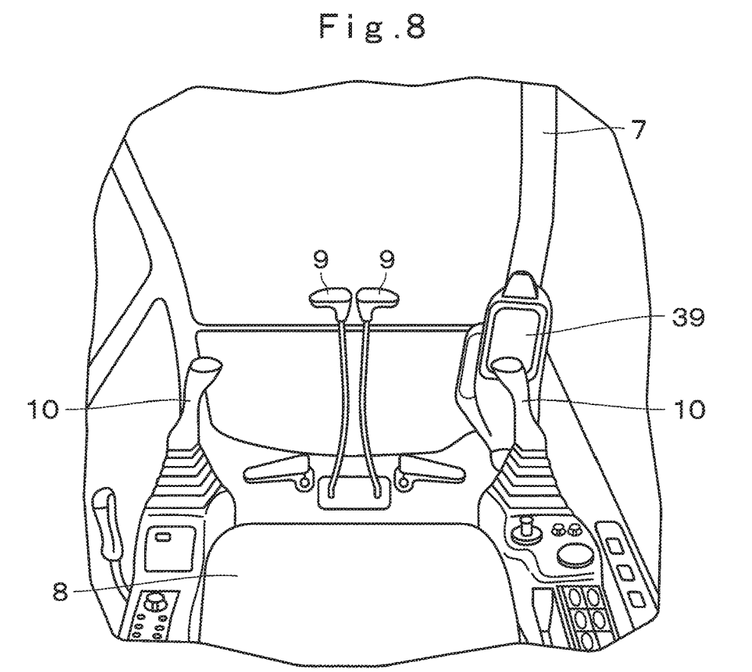
FIG. 8 is an essential part perspective view showing the inside of a cab in FIG. 1.

The upper revolving structure 4 includes a housing cover 6 that is provided on the revolving frame 5 to accommodate an engine 21 and the like, and a cab 7 for an operator getting in. As shown in FIG. 8, an operator's seat 8 on which an operator sits is provided in the cab 7, and an traveling operation device 9 that is composed of an operating lever, an operating pedal and the like, and an working operation device 10 that is composed of an operating lever and the like are provided in the periphery of the operator's seat 8. Here, the operation devices 9, 10 are respectively provided with operating amount sensors 9A, 10A that detect their operating amounts (lever operating amount OA). The operating amount sensors 9A, 10A configure a vehicle body operating state detecting device that detects an operating state of the vehicle body such as a traveling operation of the lower traveling structure 2, a revolving operation of the upper revolving structure 4 or a lifting/tilting operation (excavating operation) of the working mechanism 11 and the like, for example. Further, an in-vehicle monitor 39 to be described later is provided in the cab 7.

As shown in FIG. 1, the working mechanism 11 is configured of, for example, a boom 11A, an arm 11B, a bucket 11C, and a boom cylinder 11D, an arm cylinder 11E and a bucket cylinder 11F for driving them. The boom 11A, the arm 11B and the bucket 11C are pinned to each other. The working mechanism 11 is attached to the revolving frame 5, and extends or contracts the cylinders 11D to 11F to perform a lifting/tilting movement.

Here, the hydraulic excavator 1 is provided thereon with an electric system that controls a motor generator 27 and the like, and a hydraulic system that controls operations of the working mechanism 11 and the like. Hereinafter, an explanation will be made of the system configuration in the hydraulic excavator 1 with reference to FIG. 2 to FIG. 9.

Figure 2:
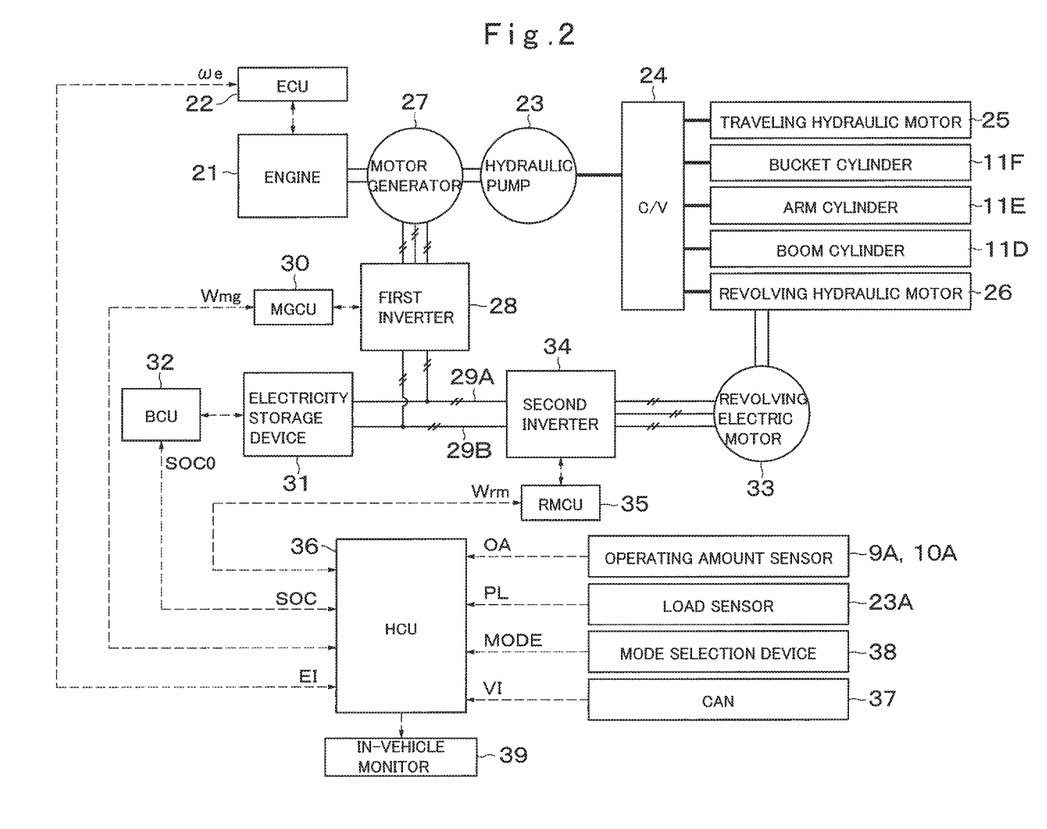
FIG. 2 is a block diagram showing a hydraulic system and an electric system that are applied to the hybrid hydraulic excavator in FIG. 1.

The engine 21 is mounted on the revolving frame 5. The engine 21 is configured of an internal combustion engine such as a diesel engine and the like, for example. A hydraulic pump 23 and the motor generator 27, which will be described later, are attached mechanically to the output side of the engine 21 for serial connection. The hydraulic pump 23 and the motor generator 27 are driven by the engine 21. Here, an operation of the engine 21 is controlled by an engine control unit 22 (hereinafter, referred to as "ECU 22"). The ECU 22 controls a rotational speed (engine rotational number) of the engine 21 based upon an engine rotational number command ωe from an HCU 36. The maximum output of the engine 21 is made smaller than the maximum power of the hydraulic pump 23, for example.

The hydraulic pump 23 is driven by the engine 21. The hydraulic pump 23 pressurizes hydraulic oil reserved in a tank (not shown), which is supplied to a traveling hydraulic motor 25, a revolving hydraulic motor 26, the cylinders 11D to 11F of the working mechanism 11, and the like as pressurized oil. The hydraulic pump 23 is provided with a load sensor 23A. The load sensor 23A detects a pump load PL to be outputted to the HCU 36 to be described later.

The hydraulic pump 23 is connected through a control valve 24 to the traveling hydraulic motor 25, the revolving hydraulic motor 26, and the cylinders 11D to 11F as hydraulic actuators. The control valve 24 selectively supplies or discharges the pressurized oil supplied from the hydraulic pump 23 to the traveling hydraulic motor 25, the revolving hydraulic motor 26, and the cylinders 11D to 11F in response to operations to the traveling operation device 9 and the working operation device 10.

Specifically, the pressurized oil is supplied to the traveling hydraulic motor 25 from the hydraulic pump 23 in response to an operation of the traveling operation device 9. As a result, the traveling hydraulic motor 25 drives/travels the lower traveling structure 2. The pressurized oil is supplied to the revolving hydraulic motor 26 from the hydraulic pump 23 in response to an operation of the working operation device 10. As a result, the revolving hydraulic motor 26 operates/revolves the upper revolving structure 4. The pressurized oil is supplied to the cylinders 11D to 11F from the hydraulic pump 23 in response to the operation of the working operation device 10. As a result, the cylinders 11D to 11F lift/tilt the working mechanism 11.

The motor generator 27 is driven by the engine 21. The motor generator 27 is configured of, for example, a synchronous electric motor and the like. The motor generator 27 plays two roles of power generation (regeneration) of performing power supply to the electricity storage device 31 and the revolving electric motor 33 by acting as an electric generator by use of the engine 21 as a power source, and power running of assisting in drives of the engine 21 and the hydraulic pump 23 by acting as a motor by use of power from the electricity storage device 31 and the revolving electric motor 33 as a power source. Accordingly, assist torque of the motor generator 27 is added to torque of the engine 21 corresponding to the condition, and the hydraulic pump 23 is driven by the engine torque and the assist torque. An operation of the working mechanism 11, a travel of the vehicle and the like are performed by the pressurized oil supplied from the hydraulic pump 23.

As shown in FIG. 2, the motor generator 27 is connected to a pair of DC buses 29A, 29B through a first inverter 28. The first inverter 28 is configured by use of a plurality of switching elements such as a transistor and an insulating gate bipolar transistor (IGBT) and the like, for example, and ON/OFF of each of the switching elements is controlled by a motor generator control unit 30 (hereinafter, referred to as "MGCU 30"). The DC buses 29A, 29B are paired at a positive terminal side and a negative terminal side, and, for example, a DC voltage of approximately several hundred V is applied thereto.

At the power generation of the motor generator 27, the first inverter 28 converts AC power from the motor generator 27 into DC power, which is supplied to the electricity storage device 31 or the revolving electric motor 33. At the power running of the motor generator 27, the first inverter 28 converts DC power of the DC buses 29A, 29B into AC power, which is supplied to the motor generator 27. The MGCU 30 controls ON/OFF of each of the switching elements in the first inverter 28 based upon a motor generator running/generating power command Wmg from the HUB 36. Thereby, the MGCU 30 controls generator power at the power generation of the motor generator 27 or drive power at the power running of the motor generator 27.

The electricity storage device 31 is connected electrically to the motor generator 27 through the first inverter 28. The electricity storage device 31 is configured of, for example, a lithium ion battery and is connected to the DC buses 29A, 29B.

The electricity storage device 31 charges power supplied from the motor generator 27 at the power generation of the motor generator 27 and supplies drive power toward the motor generator 27 at the power running (at the assist drive) of the motor generator 27. In addition, the electricity storage device 31 charges regeneration power supplied from the revolving electric motor 33 at the regeneration of the revolving electric motor 33 and supplies drive power toward the revolving electric motor 33 at the power running of the revolving electric motor 33. In this way, the electricity storage device 31 stores the power generated by the motor generator 27, and further, absorbs the regeneration power generated by the revolving electric motor 33 at the revolving braking of the hydraulic excavator 1 to hold the voltage of the DC buses 29A, 29B to be constant.

A charge operation or a discharge operation of the electricity storage device 31 is controlled by a battery control unit 32 (hereinafter, referred to as "BCU 32"). The BCU 32 detects a battery electricity storage rate SOC of the electricity storage device 31 to be outputted to the HCU 36, and controls the charge/discharge of the electricity storage device 31 such that the battery electricity storage rate SOC becomes a target electricity storage rate SOC0 to be outputted from the HCU 36.

It should be noted that in the present embodiment, a lithium ion battery, for example, having a voltage of 350 V, a discharge capacity of approximately 5 Ah, approximately 30% to 70% of an appropriate use range of the battery electricity storage rate SOC (electricity storage rate) is used in the electricity storage device 31. The appropriate use range of the battery electricity storage rate SOC and the like are not limited to the above values, but are set as needed in accordance with a specification of the electricity storage device 31 or the like.

The revolving electric motor 33 is driven by the power of the motor generator 27 or the electricity storage device 31. The revolving electric motor 33 is configured of a three-phase induction motor, for example, and is provided on the revolving frame 5 together with the revolving hydraulic motor 26. The revolving electric motor 33 drives the revolving device 3 in cooperation with the revolving hydraulic motor 26.

As shown in FIG. 2, the revolving electric motor 33 is connected to the DC buses 29A, 29B through the second inverter 34. The revolving electric motor 33 plays two roles of power running of being driven/rotated by receiving power from the electricity storage device 31 or the motor generator 27, and regeneration of charging the electricity storage device 31 by generating power with extra torque at the revolving braking. Therefore, the power from the motor generator 27 and the like is supplied through the DC buses 29A, 29B to the revolving electric motor 33 at the power running. Thereby, the revolving electric motor 33 generates rotational torque in response to an operation of the working operation device 10 to assist in a drive of the revolving hydraulic motor 26, and drives the revolving device 3 to perform a revolving operation of the upper revolving structure 4.

The second inverter 34 is, as similar to the first inverter 28, configured using a plurality of switching elements. ON/OFF of each of the switching elements in the second inverter 34 is controlled by a revolving electric motor control unit 35 (hereinafter, referred to as "RMCU 35"). At the power running of the revolving electric motor 33, the second inverter 34 converts the DC power of the DC buses 29A, 29B into AC power to be supplied to the revolving electric motor 33. At the regeneration of the revolving electric motor 33, the second inverter 34 converts the AC power from the revolving electric motor 33 into DC power to be supplied to the electricity storage device 31 and the like.

The RMCU 35 controls ON/OFF of each of the switching elements in the second inverter 34 based upon a revolving electric motor running/regenerating power command Wrm from the HCU 36. Thereby, the RMCU 35 controls regeneration power at the regeneration of the revolving electric motor 33 and drive power at the power running thereof.

The hybrid control unit (HCU) 36 configures a controller. The HCU 36 is configured of, for example, a microcomputer, and is connected electrically to the ECU 22, the MGCU 30 and the RMCU 35 using a CAN 37 (controller area network) and the like. The HCU 36 communicates with the ECU 22, the MGCU 30 and the RMCU 35, and simultaneously controls the engine 21, the motor generator 27 and the revolving electric motor 33.

The HCU 36 is connected to the operating amount sensors 9A, 10A that detect lever operating amounts OA of the operation devices 9, 10, and the load sensor 23A that detects a pump load PL of the hydraulic pump 23. In addition thereto, the HCU 36 is connected to a mode selection device 38, the in-vehicle monitor 39 and the like. Thereby, mode information MODE, the battery electricity storage rate SOC, the lever operating amount OA, the pump load PL, engine information EI and various vehicle body information VI are input to the HCU 36. It should be noted that the pump load PL is not necessarily detected directly by the load sensor 23A, but, for example, may be detected indirectly from a pressure (delivery pressure) of hydraulic oil supplied from the hydraulic pump 23.

The mode selection device 38 is configured of, for example, a switch, a dial, a lever and the like, and selects any one of three kinds of modes composed of an E mode, a P1 mode and a P2 to be described later. The mode selection device 38 is positioned in the cab 7 and is operated by an operator to output the mode information MODE corresponding to the selected mode to the HCU 36.

Figure 9:
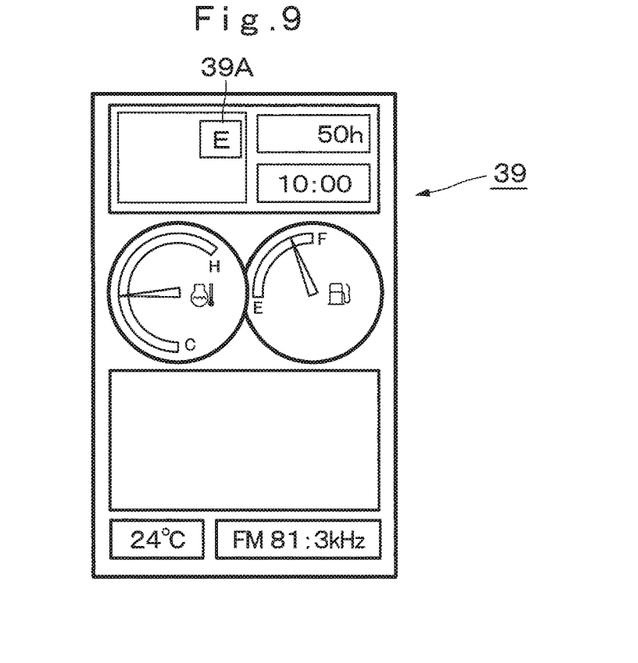
FIG. 9 is an explanatory diagram showing an example of a display screen displayed on an in-vehicle monitor.

As shown in FIG. 8 and FIG. 9, the in-vehicle monitor 39 is arranged in the cab 7, and displays various pieces of information in regard to the vehicle body such as a remaining amount of fuel, a water temperature of engine cooling water, a working time and an in-compartment temperature. In addition thereto, the in-vehicle monitor 39 is connected to the HCU 36, and is provided with a mode display part 39A. A mode selected from the E mode, the P1 mode and P2 mode by the mode selection device 38 is displayed on the mode display part 39A. It should be noted that the in-vehicle monitor 39 may display the mode information MODE (the E mode, the P1 mode or the P2 mode) by connection to the mode selection device 38.

The HCU 36 controls the engine 21, the motor generator 27, and the revolving electric motor 33 corresponding to the mode selected by the mode selection device 38. Therefore, next an explanation will be made of a specific structure of the HCU 36 with reference to FIG. 3 to FIG. 7.

Figure 3:
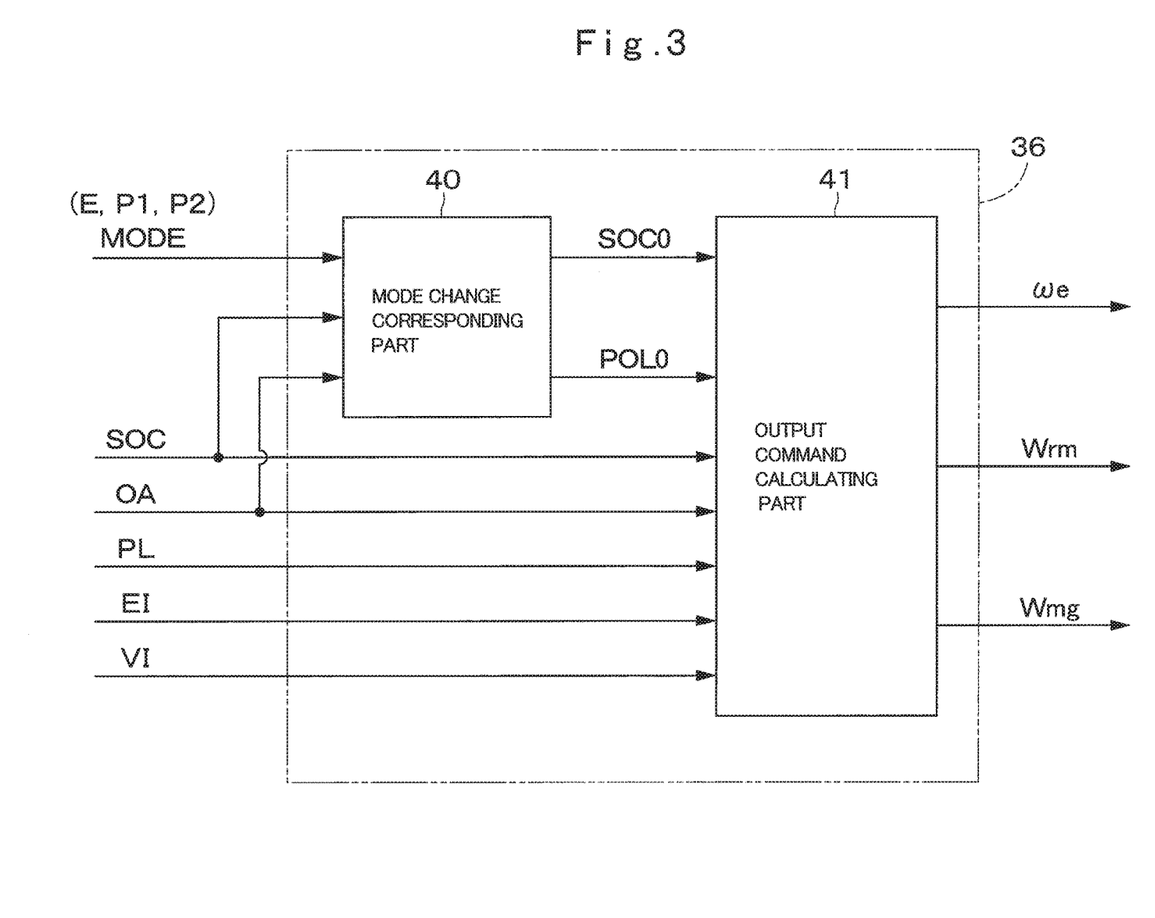
FIG. 3 is a block diagram showing a hybrid control unit in FIG. 2.

As shown in FIG. 3, the HCU 36 includes a mode change corresponding part 40 and an output command calculating part 41. The HCU 36 outputs an engine rotational number command ωe, a revolving electric motor running/regenerating power command Wrm and a motor generator running/generating power command Wmg based upon mode information MODE, a battery electricity storage rate SOC, a lever operating amount OA, a pump load PL, engine information EI and various vehicle body information VI.

The mode change corresponding part 40 calculates a target electricity storage rate SOC0 and a pump output limit POL0 based upon the mode information MODE, the battery electricity storage rate SOC and the lever operating amount OA to be outputted. At this time, the target electricity storage rate SOC0 is a target value of the battery electricity storage rate SOC of the electricity storage device 31. The pump output limit POL0 is a limit value of the maximum output in the hydraulic pump 23.

The output command calculating part 41 calculates an engine rotational number command ωe, a revolving electric motor running/regenerating power command Wrm and a motor generator running/generating power command Wmg based upon the target electricity storage rate SOC0, the pump output limit POL0, the battery electricity storage rate SOC, the lever operating amount OA, the pump load PL, the engine information EI and various vehicle body information VI to be outputted.

Therefore, an explanation will be made of the mode change corresponding part 40 with reference to FIG. 4 to FIG. 6. The mode change corresponding part 40 determines the target electricity storage rate SOC0 corresponding the mode information MODE, and determines the pump output limit POL0 corresponding the mode information MODE, the battery electricity storage rate SOC and the lever operating amount OA. Therefore, the mode change corresponding part 40 receives the mode information MODE by the mode selection device 38, the lever operating amount OA by the operating amount sensor 10A and the battery electricity storage rate SOC transmitted from the BCU 32 as input, and has the target electricity storage rate SOC0 and the pump output limit POL0 as output values. The mode change corresponding part 40 includes a target electricity storage rate changing part 40A, a pump output limit changing part 40B, a first-order lag filter 40C, a pump output limit change determining part 40D, and a delay part 40E.

The target electricity storage rate changing part 40A outputs a target electricity storage rate changing value SOCn. Specifically, the target electricity storage rate changing part 40A selects and outputs a target electricity storage rate changing value SOCn preliminarily set corresponding to the mode (E mode, P1 mode or P2 mode) selected from the input mode information MODE, based upon a changing value table 42 of a target electricity storage rate and a pump output limit shown in FIG. 5.

The pump output limit changing part 40B outputs a pump output limit changing value POLn. Specifically, the pump output limit changing part 40B selects and outputs a pump output limit changing value POLn preliminarily set corresponding to the mode (E mode, P1 mode or P2 mode) selected from the input mode information MODE, based upon the changing value table 42 of the target electricity storage rate and the pump output limit shown in FIG. 5.

Here, the selectable mode includes three kinds of modes of the E mode, the P1 mode and the P2 mode. Among them, the E mode is defined as a mode to be selected in a case where an operator prioritizes fuel consumption over a working amount. As shown in FIG. 5, in the E mode, for prioritizing the fuel consumption, the pump output limit changing value POLn is set to a smaller value as compared to the other modes (P1 mode or P2 mode). Accordingly, since it is not necessary for the electricity storage device 31 to hold so much energy, the target electricity storage rate changing value SOCn is set to a low value (for example, 40%) equal to or less than a half of an appropriate use range (30% to 70%) of the battery electricity storage rate SOC to prioritize the lifetime.

The P1 mode is defined as a mode to be selected in a case where an operator prioritizes a working amount over fuel consumption. In the P1 mode, for prioritizing the working amount, the pump output limit changing value POLn is set to a larger value as compared to the E mode. Accordingly, since it is necessary for the electricity storage device 31 to hold energy as much as possible, the target electricity storage rate changing value SOCn is set to a high value (for example, 60%) equal to or more than a half of the appropriate use range of the battery electricity storage rate SOC.

Further, the P2 mode is selected at the time of restlessly performing a heavy work, for example, as at a climbing travel and the like, and is defined as a mode to be selected in a case where an operator gives top priority to a continuing force of the work ahead of the lifetime of the electricity storage device 31. The P2 mode corresponds to a maximum electricity storage rate mode that sets the target electricity storage rate SOC0 to a value close to the maximum value in the appropriate use range of the electricity storage device 31.

Figure 5:
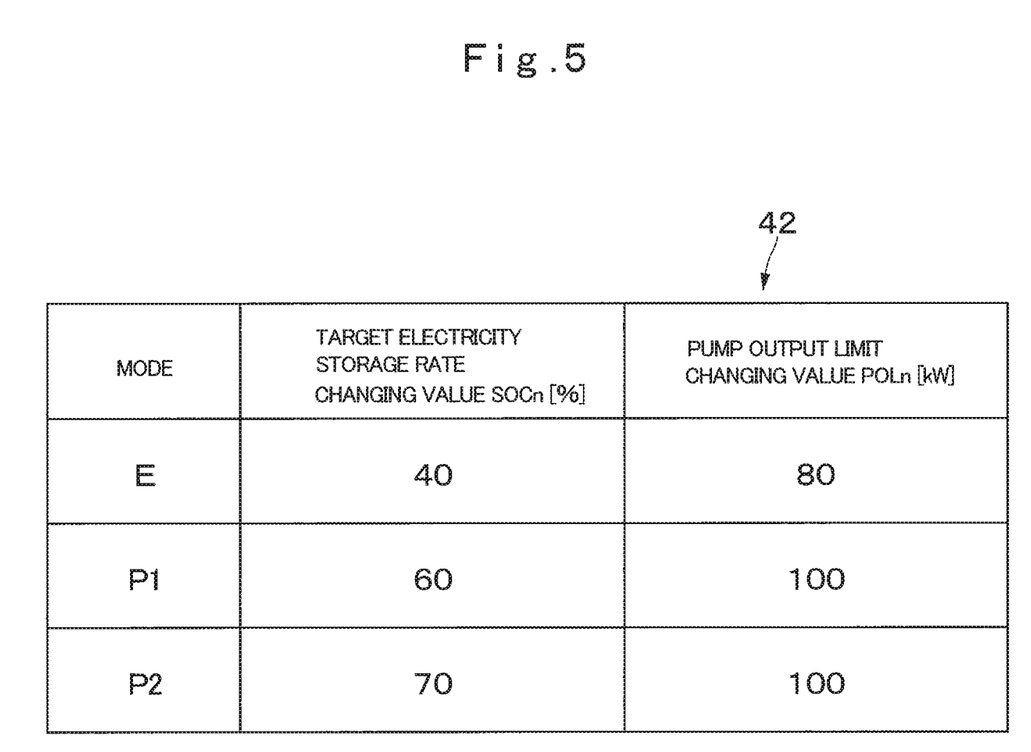
FIG. 5 is an explanatory diagram showing a change value table of a target electricity storage rate and a pump output limit.
Figure 6:
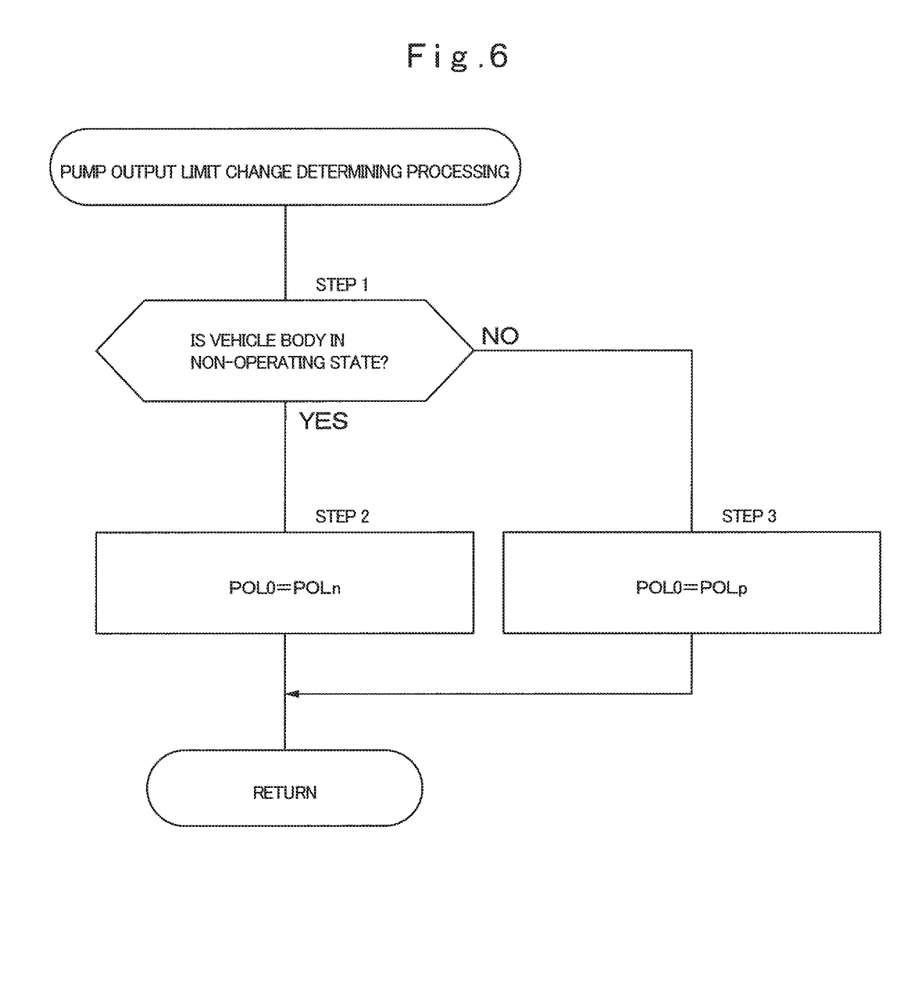
FIG. 6 is a flow chart showing pump output limit change determining processing.

It should be noted that the target electricity storage rate changing value SOCn and the pump output limit changing value POLn of each mode are not limited to those described in FIG. 5, but are set as needed corresponding to the specification of the hydraulic excavator 1 and the like.

Figure 4:
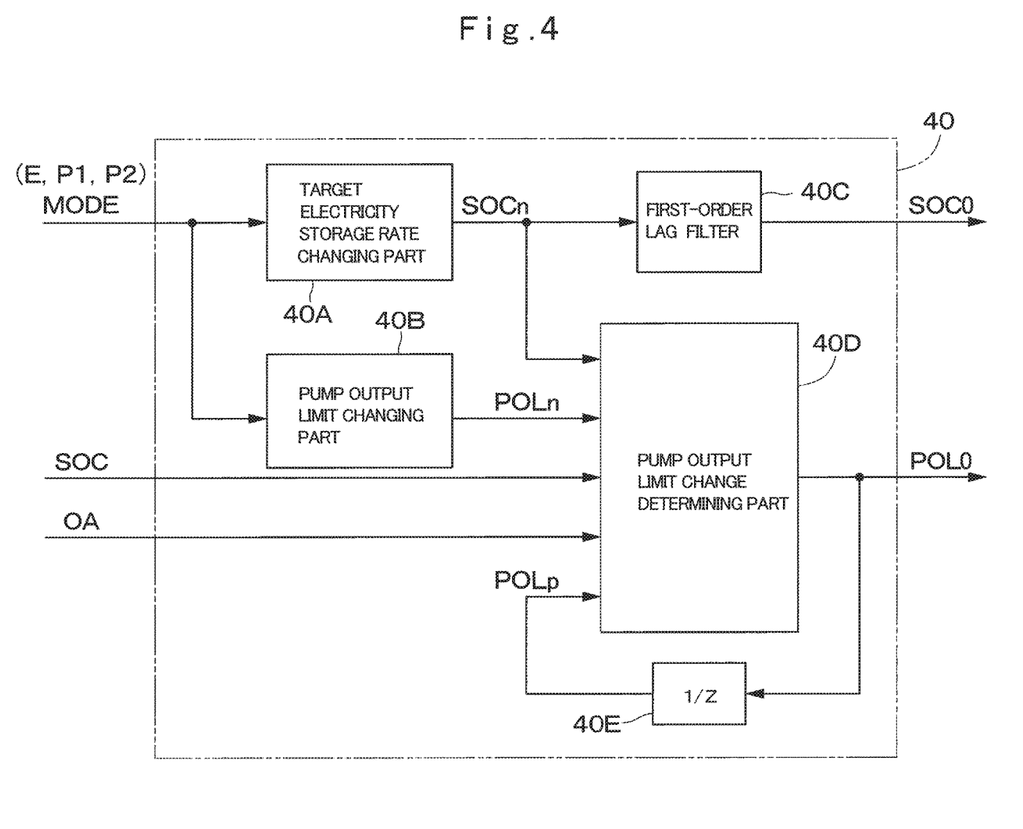
FIG. 4 is a block diagram showing a mode change corresponding part in FIG. 3.

As shown in FIG. 4, the target electricity storage rate changing value SOCn determined by the target electricity storage rate changing part 40A is outputted as the target electricity storage rate SOC0 through the first-order lag filter 40C. At this time, the first-order lag filter 40C has a time constant of approximately several seconds (for example, approximately 3 to 7 seconds). The time constant is set based upon, for example, a time necessary for one operation of each of the revolving device 3 and the working mechanism 11. Thereby, the target electricity storage rate SOC0 gradually changes from a target electricity storage rate previous value SOCp to a target electricity storage rate changing value SOCn.

At the same time, the target electricity storage rate changing value SOCn outputted from the target electricity storage rate changing part 40A, the pump output limit changing value POLn outputted from the pump output limit changing part 40B and the battery electricity storage rate SOC outputted from the BCU 32 are input to the pump output limit change determining part 40D, and a pump output limit previous value POLp retained in the delay part 40E is input thereto. Further, the lever operating amount OA from each of the operating amount sensors 9A, 10A is input to the pump output limit change determining part 40D. The pump output limit change determining part 40D executes pump output limit change determining processing shown in FIG. 6 based upon the inputs. Thereby, the pump output limit change determining part 40D determines whether to change the pump output limit POL0 to the pump output limit changing value POLn or retain the pump output limit POL0 to the pump output limit previous value POLp, and outputs the determined pump output limit POL0.

Here, an explanation will be made of the processing at the pump output limit change determining part 40D with reference to FIG. 6. When the mode is changed, the target electricity storage rate SOC0 and the pump output limit POL0 are changed at the same time. However, as hereinafter shown, the pump output limit POL0 is set to any one of the pump output limit changing value POLn and the pump output limit previous value POLp depending on whether or not the vehicle body is in a non-operating state.

At step 1, it is determined whether or not the vehicle body is in a non-operating state from a lever operating amount OA. When a determination of "YES" is made at step 1, since there is no operation of traveling, revolving, lifting/tilting movements of the vehicle body, the process goes to step 2.

At step 2, a pump output limit POL0 is changed to a pump output limit changing value POLn, and the pump output limit POL0 is outputted.

On the other hand, when a determination of "NO" is made at step 1, since an operation of any one of traveling, revolving, lifting/tilting movements of the vehicle body is performed, the process goes to step 3. At step 3, the pump output limit POL0 is retained to a pump output limit previous value POLp, and the pump output limit POL0 is outputted. When steps 2, 3 end, the process returns.

Thereby, the pump output limit change determining part 40D changes the pump output limit POL0 to the pump output limit changing value POLn when the vehicle body is in the non-operating state, and retains the pump output limit POL0 to the pump output limit previous value POLp when the vehicle body is in the operating state.

The target electricity storage rate changing part 40A and the first-order lag filter 40C in the mode change corresponding part 40 configure a target electricity storage rate setting part that sets the target electricity storage rate SOC0 corresponding to the selected mode. In addition, the pump output limit changing part 40B and the pump output limit change determining part 40D in the mode change corresponding part 40 configure a maximum power setting part that increases or decreases the maximum power of the hydraulic pump 23.

Figure 7:
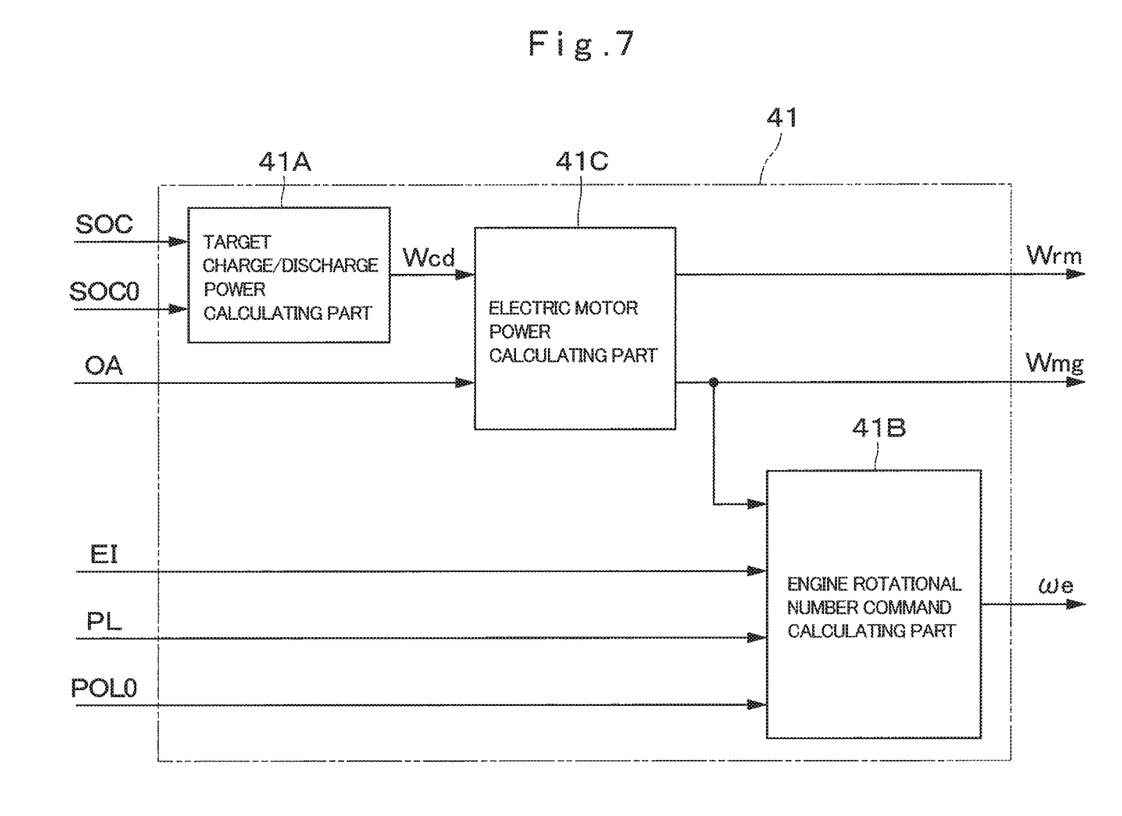
FIG. 7 is a block diagram showing an output command calculating part in FIG. 3.

Next, an explanation will be made of the output command calculating part 41 of the HCU 36 with reference to FIG. 7. The output command calculating part 41 calculates an engine rotational number command ωe of the engine 21, a motor generator running/generating power command Wmg of the motor generator 27 and a revolving electric motor running/regenerating power command Wrm of the revolving electric motor 33, based upon the target electricity storage rate SOC0 and the pump output limit POL0 determined in the mode change corresponding part 40, further, the battery electricity storage rate SOC, the lever operating amount OA, the pump load PL, the engine information EI and various vehicle body information VI to be outputted. The output command calculating part 41 controls the engine 21, the motor generator 27 and the revolving electric motor 33 by the commands ωe, Wmg, Wrm such that the battery electricity storage rate SOC approaches the target electricity storage rate SOC0 and the charge or discharge is performed in the vicinity thereof.

An explanation will be made of control processing in a case of controlling a rotational number of the engine 21 as an example of the output command calculating part 41 with reference to FIG. 7. Hereinafter, a discharge of the electricity storage device 31 is indicated at plus (+) and a charge thereof is indicated at minus (−), and power running of the electric motor is indicated at plus (+), and power generation and regeneration are indicated at minus (−).

The output command calculating part 41 includes a target charge/discharge power calculating part 41A, an engine rotational number command calculating part 41B and an electric motor power calculating part 41C. The battery electricity storage rate SOC and the target electricity storage rate SOC0 are input to the target charge/discharge power calculating part 41A. At this time, the target charge/discharge power calculating part 41A determines target charge/discharge power Wcd such that as an electricity storage rate difference ΔSOC between the battery electricity storage rate SOC and the target electricity storage rate SOC0 is the larger, the electricity storage rate difference ΔSOC is the smaller. Specifically, the target charge/discharge power calculating part 41A determines and outputs the target charge/ discharge power Wcd, for example, such that as a value of the electricity storage rate difference $\Delta SOC$ ($\Delta SOC=SOC-SOC0$) and a value of the target charge/discharge power Wcd have a positive correlation.

Next, the target charge/discharge power Wcd and the lever operating amount OA are input to the electric motor power calculating part 41C. The electric motor power calculating part 41C determines power running and braking of the revolution by the lever operating amount OA, and outputs the revolving electric motor running/regenerating power command Wrm. Then, the electric motor power calculating part 41C calculates the motor generator running/generating power command Wmg by a difference between the target charge/discharge power Wcd and the revolving electric motor running/regenerating power command Wrm, and outputs the motor generator running/generating power command Wmg.

Further, the motor generator running/generating power command Wmg, the engine information E1, the pump load PL, and the pump output limit POL0 are input to the engine rotational number command calculating part 41B. When the pump load PL is smaller than the pump output limit POL0, the engine rotational number command calculating part 41B finds engine target output by addition of the pump load PL and the motor generator running/generating power command Wmg. When the pump load PL is larger than the pump output limit POL0, the engine rotational number command calculating part 41B finds engine target output by addition of the pump output limit POL0 and the motor generator running/generating power command Wmg. On top of that, the engine rotational number command calculating part 41B calculates the engine rotational number command $\omega e$ based upon the engine information E1 such as the present engine rotational number and the like and the engine target output, and outputs the engine rotational number command $\omega e$.

It should be noted that a case where the output command calculating part 41 calculates the motor generator running/generating power command Wmg, the revolving electric motor running/regenerating power command Wrm and the engine rotational number command $\omega e$ based upon the target electricity storage rate SOC0, the pump output limit POL0, the battery electricity storage rate SOC, the lever operating amount OA, the pump load PL and the engine information EI is explained as an example. However, the present invention is not limited thereto, but the output command calculating part 41 may calculate the motor generator running/generating power command Wmg, the revolving electric motor running/regenerating power command Wrm and the engine rotational number command $\omega e$ based upon the target electricity storage rate SOC0, the pump output limit POL0, the battery electricity storage rate SOC, the lever operating amount OA, the pump load PL, the engine information EI, and further, various vehicle body information V1 such as a vehicle speed, a water cooling temperature and a fuel remaining amount and the like, for example.

The HCU 36 calculates the motor generator running/generating power command Wmg, the revolving electric motor running/regenerating power command Wrm and the engine rotational number command $\omega e$ by the above calculation processing. Then, the HCU 36 outputs the motor generator running/generating power command Wmg to the first inverter 28, outputs the revolving electric motor running/regenerating power command Wrm to the second inverter 34 and transmits the engine rotational number command $\omega e$ to the ECU 22. Thereby, the HCU 36 performs realization of an intended vehicle body movement by an operator, and controls of the motor generator 27, the revolving electric motor 33 and the engine 21 such that the battery electricity storage rate SOC converges in the target electricity storage rate SOC0 set by the mode.

In this way, according to the present embodiment, the HCU 36 changes the target electricity storage rate SOC0 of the electricity storage device 31 corresponding to the mode that an operator selects out of the E mode, the P1 mode and the P2 mode by the mode selection device 38. Thereby, an operator can actively select priority between the lifetime of the electricity storage device 31 and the working amount resulting from the stored energy in the electricity storage device 31.

For example, at a light load, it is possible to lower the target electricity storage rate SOC0 by selecting the E mode. Therefore, the electricity storage device 31 repeats the charge/discharge in a state where the battery electricity storage rate SOC is low to suppress a degradation of the electricity storage device 31, making it possible to extend the lifetime of the electricity storage device 31. On the other hand, at a heavy load, it is possible to increase the target electricity storage rate SOC0 by selecting the P1 mode or the P2 mode. Thereby, since it is possible to reserve large energy in the electricity storage device 31, power supply to the motor generator 27 is performed for longer hours, making it possible to assist in the engine 21 by power running of the motor generator 27, that is, perform the movement of the vehicle body according to a demand of an operator.

The HCU 36 sets the pump output limit POL0 in the E mode low in the target electricity storage rate SOC0 to be smaller than in the P1 mode or the P2 mode high in the target electricity storage rate SOC0. Thereby, even in the E mode in which the lifetime takes priority, it is possible to limit the maximum output of the hydraulic pump 23 to be a smaller value as compared to the P1 mode or the P2 mode. As a result, for example, since the discharge energy amount of the electricity storage device 31 by the power running of the motor generator 27 or the revolving electric motor 33 can be made small, it is possible to prevent an energy shortage (power shortage) of the electricity storage device 31.

Since the first-order lag filter 40C is provided in the output side of the target electricity storage rate changing part 40A, the mode change corresponding part 40 of the HCU 36 gradually changes the target electricity storage rate SOC0 from the target electricity storage rate previous value SOCp to the target electricity storage rate changing value SOCn time-sequentially. Thereby, since it is possible to prevent an abrupt change of the battery electricity storage rate SOC by the mode change, an unexpected vehicle body movement can be prevented.

In addition thereto, the mode change corresponding part 40 of the HCU 36 changes the pump output limit POL0 when the mode is changed by the mode selection device 38 and the vehicle body becomes in the non-operating state. Therefore, the maximum power of the hydraulic pump 23 is not changed in the halfway of the operating of the vehicle body such as in the halfway of the traveling of the lower traveling structure 2, in the halfway of the revolving of the upper revolving structure 4 and in the halfway of the excavating operation of the working mechanism 11 and the like, for example, and it is possible to change the maximum power of the hydraulic pump 23 in a stop state of the vehicle body. As a result, even at the time of changing the mode, an unexpected vehicle body movement can be prevented.

The mode selection device 38 can select the P2 mode in which the target electricity storage rate SOC0 is set to the vicinity of the maximum use range of an appropriate battery electricity storage rate SOC. Thereby, even at the time of restlessly performing a heavy load work such as at the climbing travel and the like, for example, top priority can be given to a work continuing force by selection of the P2 mode by an operator, and it is possible to continue the vehicle body movement for a long time as much as possible.

Further, since there is provided the in-vehicle monitor 39 that displays the mode selected by the mode selection device 38, an operator can easily recognize the mode selected at present by visual contact with the in-vehicle monitor 39. Therefore, since it is possible to easily compare a work demanded by an operator with the present mode, the mode can be quickly changed in a case where both of them are different from each other.

Since the maximum output of the engine 21 is made smaller than the maximum power of the hydraulic pump 23, it is possible to use the engine 21 that is small in size and is capable of reducing fuel consumption. On the other hand, since the maximum output of the engine 21 is made smaller than the maximum power of the hydraulic pump 23, as compared to a case where the engine output is sufficiently larger than the maximum pump load, a contribution percentage of the engine assist by power running of the motor generator 27 at the vehicle body movement is larger and there is a tendency that the frequency at which the electricity storage device 31 repeats the charge/discharge becomes high. In contrast, in the present embodiment, the target electricity storage rate SOC0 can be set to a low value by selecting the E mode. As a result, as compared to a case where the target electricity storage rate SOC0 is set to a high value, a degradation of the electricity storage device 31 can be suppressed.

It should be noted that in the above embodiment, the mode selection device 38 can select the three kinds of modes (E mode, P1 mode, P2 mode) in which the different target electricity storage rate SOC0 and the different pump output limit POL0 are set. However, the present invention is not limited thereto, but a mode selection device may select four kinds of modes or more, and a target electricity storage rate or a pump output limit may be controlled more finely according to these modes. The mode selection device may select a fourth mode in which a target electricity storage rate and a pump output limit intermediate between the E mode and the P1 mode are set. Further, the mode selection device may select two kinds of modes by excluding any one of the P1 mode and the P2 mode.

The mode change corresponding part 40 in the above embodiment gradually changes the target electricity storage rate SOC0 from the target electricity storage rate previous value SOCp to the target electricity storage rate changing value SOCn by the first-order lag filter 40C. However, the present invention is not limited thereto, but it is only required to gradually change the target electricity storage rate SOC0 time-sequentially, and, for example, the target electricity storage rate SOC0 may be changed proportionally from the target electricity storage rate previous value SOCp to the target electricity storage rate changing value SOCn in a predetermined transitional time.

In the above embodiment, the maximum output of the engine 21 is made smaller than the maximum power of the hydraulic pump 23, but the maximum output of the engine 21 is appropriately set corresponding to a specification of the hydraulic excavator 1 or the like. Therefore, the maximum output of the engine 21 may be approximately close to the maximum power of the hydraulic pump 23, or may be smaller than the maximum power of the hydraulic pump 23.

In the above embodiment, an example of using the lithium ion battery in the electricity storage device 31 is explained, but a secondary battery (for example, nickel cadmium battery or nickel hydrogen battery) or a capacitor that can supply necessary power may be adopted. In addition, a voltage increase-reduce device such as a DC-DC converter may be provided between an electricity storage device and a DC bus.

In the above embodiment, the rotational number of the engine 21 is limited corresponding to the pump output limit POL0, but, for example, in a case of using a variable capacity hydraulic pump, a delivery capacity of the hydraulic pump may be changed corresponding to the pump output limit POL0.

The above embodiment is provided with the revolving hydraulic motor 26 and the revolving electric motor 33. However, the present invention is not limited thereto, but, for example, it may be configured that anyone of the revolving hydraulic motor 26 and the revolving electric motor 33 may be eliminated.

In the above embodiment, an example of using the hydraulic excavator 1 of a crawler type as the hybrid construction machine is explained. However, the present invention is not limited thereto, but the present invention may be applied to a hybrid construction machine that is provided with a motor generator jointed to an engine and a hydraulic pump, and an electricity storage device, and for example, may be applied to various types of construction machines such as a wheel type hybrid hydraulic excavator, a hybrid wheel loader or a hybrid dump truck and the like.

DESCRIPTION OF REFERENCE NUMERALS

1: Hybrid-type hydraulic excavator
2: Lower traveling structure (Vehicle body)
4: Upper revolving structure (Vehicle body)
9: Traveling operation device
9A, 10A: Operating amount sensor (Vehicle body operating state detecting device)
10: Working operation device
11: Working mechanism
11D: Boom cylinder (Hydraulic actuator)
11E: Arm cylinder (Hydraulic actuator)
11F: Bucket cylinder (Hydraulic actuator)
21: Engine
23: Hydraulic pump
25: Traveling hydraulic motor (Hydraulic actuator)
26: Revolving hydraulic motor (Hydraulic actuator)
27: Motor generator
31: Electricity storage device
33: Revolving electric motor
36: Hybrid control unit (Controller)
38: Mode selection device
39: In-vehicle monitor
40: Mode change corresponding part
40A: Target electricity storage rate changing part
40B: Pump output limit changing part
40C: First-order lag filter
40D: Pump output limit change determining part
40E: Delay part
41: Output command calculating part

The invention claimed is:
1. A hybrid construction machine comprising:
an engine that is provided on a vehicle body;
a hydraulic pump that is connected mechanically to said engine;
a hydraulic actuator that is driven by pressurized oil from said hydraulic pump;

a motor generator that is connected mechanically to said engine;

an electricity storage device that is connected electrically to said motor generator; and a controller that controls charge/discharge power of said motor generator and said electricity storage device, wherein a mode selection device that selects any one of a plurality of modes in which target electricity storage rates differing from each other are set in an appropriate use range of the electricity storage rates of said electricity storage device is further provided, and said controller controls the charge/discharge power of said motor generator and said electricity storage device such that the electricity storage rate of said electricity storage device converges with a target electricity storage rate of the mode selected by said mode selection device.

2. The hybrid construction machine according to claim 1, wherein said controller includes a maximum power setting part that increases or decreases maximum power of said hydraulic pump, wherein said maximum power setting part limits the maximum power of said hydraulic pump to a smaller value according to the lowering of the target electricity storage rate of the mode selected by said mode selection device.

3. The hybrid construction machine according to claim 2, further comprising:

a vehicle body operating state detecting device that detects an operating state of said vehicle body, wherein said maximum power setting part changes the maximum power of said hydraulic pump when the mode is changed by said mode selection device and a non-operating state of said vehicle body is detected by said vehicle body operating state detecting device.

4. The hybrid construction machine according to claim 2, wherein said mode selection device does not limit the maximum power of said hydraulic pump and can select a maximum electricity storage rate mode in which the target electricity storage rate is set in the vicinity of the maximum electricity storage rate of said electricity storage device.

5. The hybrid construction machine according to claim 1, wherein said controller continuously and gradually changes a value of the target electricity storage rate from a value before mode change to a value after mode change when the mode is changed by said mode selection device.

6. The hybrid construction machine according to claim 1, further comprising:

an in-vehicle monitor that displays the mode selected by said mode selection device.

7. The hybrid construction machine according to claim 1, wherein maximum output of said engine is made smaller than the maximum power of said hydraulic pump.

* * * * *